(12) United States Patent
Sugimoto

(10) Patent No.: US 8,438,988 B2
(45) Date of Patent: May 14, 2013

(54) POWDERING DEVICE FOR POWDERING PRINTED SHEET

(75) Inventor: Ikuo Sugimoto, Tsukuba (JP)

(73) Assignee: Komori Corporation, Tokyo (JP)

( * ) Notice: Subject to any disclaimer, the term of this patent is extended or adjusted under 35 U.S.C. 154(b) by 1300 days.

(21) Appl. No.: 12/196,996

(22) Filed: Aug. 22, 2008

(65) Prior Publication Data
US 2009/0078194 A1 Mar. 26, 2009

(30) Foreign Application Priority Data

Sep. 20, 2007 (JP) ................................. 2007-243714

(51) Int. Cl.
*B05C 11/02* (2006.01)
*B05D 7/00* (2006.01)
(52) U.S. Cl.
USPC ......................................... 118/126; 427/212
(58) Field of Classification Search .................. None
See application file for complete search history.

(56) References Cited

U.S. PATENT DOCUMENTS

| 2,645,529 | A | | 7/1953 | Jenner et al. |
| 3,161,442 | A | * | 12/1964 | Reed ................................ 406/63 |
| 5,573,149 | A | * | 11/1996 | Saito ............................. 222/636 |
| 5,615,830 | A | * | 4/1997 | Matsunaga et al. ............... 239/8 |
| 5,660,633 | A | | 8/1997 | Murata et al. |
| 6,250,513 | B1 | | 6/2001 | Haas et al. |
| 6,615,723 | B1 | | 9/2003 | Haas et al. |

FOREIGN PATENT DOCUMENTS

| DE | 28 07 866 B1 | 1/1979 |
| JP | 2-76738 A | 3/1990 |
| JP | 3825298 B2 | 6/2002 |
| JP | 3790103 B2 | 3/2003 |
| WO | WO-00/09336 A1 | 2/2000 |

* cited by examiner

*Primary Examiner* — Dah-Wei Yuan
*Assistant Examiner* — Charles Capozzi
(74) *Attorney, Agent, or Firm* — Birch, Stewart, Kolasch & Birch, LLP

(57) ABSTRACT

A powdering device includes: a powder placing member having a placing section on which a powder fed from a storage container is placed; a first scraping member for scraping the powder on the placing section of the powder placing member, so that a constant amount of the powder remains on the placing section; and a second scraping member for scraping off the resultant constant-amount powder remaining on the placing section, and the powdering device transfers the scraped powder with an air flow, and sprays the powder thus transferred onto a printed sheet.

7 Claims, 8 Drawing Sheets

POWDERING DEVICE FOR POWDERING PRINTED SHEET

BACKGROUND OF THE INVENTION

1. Field of the Invention

The present invention relates to a powdering device for spraying an anti-setoff powder onto a printed surface of a printed sheet made by a sheet-fed printing press.

2. Description of the Related Art

In a sheet-fed printing press, such as a sheet-fed offset printing press, printed sheets, that is, printing products are transferred to and piled on a pile board. When printing products are piled with ink on the printing products being not sufficiently dried, a printing trouble called a blocking (offset) often occurs. In the blocking, a part of an image on the front side of a preceding printing product is transferred, due to the weight of a following printing product piled on the preceding printing product, to the back side of the following printing product. For the purpose of preventing the blocking trouble, a powder made primarily from cornstarch or the like is sprayed onto printing products being transferred to a pile board after completion of printing.

It is generally required that the amount of powder sprayed onto a printing product be very small and be uniform as time elapses. If the amount of sprayed powder is less than a required amount, the blocking cannot be sufficiently prevented from occurring. By contrast, if the amount of sprayed powder exceeds the required amount, a large amount of the powder is attached to a printing product to thus roughen the texture of the surface of the printing product, thereby deteriorating the quality of the printing product. Moreover, an excessive amount of the powder is scattered around, eventually polluting the environment. For this reason, it is necessary that an adequate but not excessive amount of powder to be sprayed should be stably and continuously fed.

Japanese Patent No. 3825298 discloses an example of a powder spraying device with the amount of powder to be sprayed taken into consideration. The spraying device described in Japanese Patent No. 3825298 has a structure in which an appropriate-amount distribution roll having multiple grooves formed in the peripheral surface thereof is rotated about a horizontal axis in a housing. A storage container is positioned above the housing, and a jetting device for sucking the powder with a negative pressure so as to jet the powder downwards is connected to the lower side of the housing. The powder in the storage container enters the grooves of the appropriate-amount distribution roll. Then, the powder having entered the grooves is moved along the housing in association with the rotation of the appropriate-amount distribution roll about the horizontal axis, then falling down from the grooves at a lower portion so as to be discharged. The powder falling down from below is carried out in an air flow generated by the jetting device, and is discharged downward. The powder thus discharged downward passes through unillustrated piping connected with unillustrated tubes, thereby being transported to unillustrated nozzles for jetting the powder onto a surface of a printing product.

In addition, Japanese Patent Application Publication No. Hei 2-76738 discloses another example of a powder spraying device. In this powder-spraying device, a powder storage body is disposed above predetermined-powder-amount extruding screws which rotate about the vertical axis, while a mixing chamber for mixing the powder with air and a nozzle for discharging the powder mixed with the air are disposed below the screws. The powder in the powder storage body is caused to fall down into the mixing chamber by the predetermined-powder-amount extruding screws. The powder is then mixed with air in the mixing chamber, and thereafter, is sprayed onto a printing product through the nozzle.

The powder spraying device disclosed in Japanese Patent No. 3825298, however, has the following problem. This powder spraying device is configured so that the rotation of the appropriate-amount distribution roll causes the powder to be fed into the annular grooves about the horizontal axis. However, the weight of the powder inside the storage container is always applied to the powder stuffed in the grooves, so that the density of the powder stuffed in the space in the grooves is increased. Since the amount of the powder in the storage container constantly varies, the weight applied to the powder stuffed in the grooves changes. Accordingly, the degree of increase in the density of the powder in the space in the grooves is changed in accordance with the change in weight applied to the powder stuffed in the grooves. Since the powder stuffed in the grooves is transferred in such state by the friction with the peripheral surface of the appropriate-amount distribution roll, an appropriate amount of the powder cannot be precisely distributed.

On the other hand, the powder spraying device according to Japanese Patent Application Publication No. Hei 2-76738 has the following problem. This powder spraying device is configured so that the powder stuffed between the predetermined-powder-amount extruding screws is supplied. However, the weight of the powder in the powder storage is always applied to the powder stuffed between the predetermined-powder-amount extruding screws, so that the density of the powder stuffed in the space between the predetermined-powder-amount extruding screws is increased. Since the amount of the powder in the powder storage constantly varies, the weight applied to the powder stuffed between the screws changes. Accordingly, the degree of increase in the density of the powder in the space between the screws is changed in accordance with the change in weight applied to the powder stuffed between the screws. Since the powder stuffed between the screws in such state is transferred by the friction with the peripheral surface of the predetermined-powder-amount extruding screws, a constant amount of the powder cannot be precisely distributed. Moreover, the powder may possibly fall down excessively due to its own weight. As a result, it is further difficult to precisely distribute the powder.

Note that, consider that a stirring plate for loosening the powder in the storage container is disposed in the powdering device described in the Japanese Patent No. 3825298. In this case, it is necessary, for example, to provide a mechanism for converting the rotation about the horizontal axis into the rotation about the vertical axis as described in Japanese Patent Application Publication No. Hei 2-76738.

SUMMARY OF THE INVENTION

An aspect of the present invention is a powdering device for powdering a printed sheet, including: a storage container and an appropriate-powder-amount distribution mechanism disposed below the storage container. The storage container stores a powder, and the appropriate-powder-amount distribution mechanism feeds an appropriate amount of the powder into an air flow for carrying the powder. In the powdering device, the appropriate-powder-amount distribution mechanism includes: an opening which is formed below the storage container, and into which the powder from the storage container is fed; a powder placing member which is rotated about a vertical axis, which has an axisymmetrical shape about a rotational axis, and which has, in a part thereof, a placing section on which the powder fed from the opening is placed;

a first scraping member for making, substantially uniform, the amount of the powder placed on the placing section of the powder placing member in association with the rotation of the powder placing member about the vertical axis; and a second scraping member for scraping off, into the air flow, the powder caused to remain on the placing section of the powder placing member by the first scraping member, in association with the rotation of the powder placing member about the vertical axis.

According to the powdering device for powdering a sheet of the present invention, the powder is placed on the placing section of the powder placing member from the opening in the appropriate-powder-amount distribution mechanism. The powder is then scraped by the first scraping member in association with the rotation of the powder placing member about the vertical axis, so that a substantially constant amount of the powder remains. The powder remaining on the placing section after the scraping of the first scraping member is scraped off by the second scraping member to be mixed with the air flow therebelow. Accordingly, a substantially constant amount of the powder remains on the placing section by the scraping of the first scraping member, and the powder is not subjected to any pressure while being moved along with the placing section. As a result, a stable amount of the powder can constantly be sprayed onto a sheet.

Moreover, according to the powdering device for powdering a sheet of the present invention, by changing the rotational speed of the powder placing member, it is possible to control the amount of the powder to be sprayed. In this way, the amount of the powder to be sprayed can be controlled in accordance with the type of printing medium (paper, a film, or the like), the printing speed, the type and density of a printing image, and the like.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
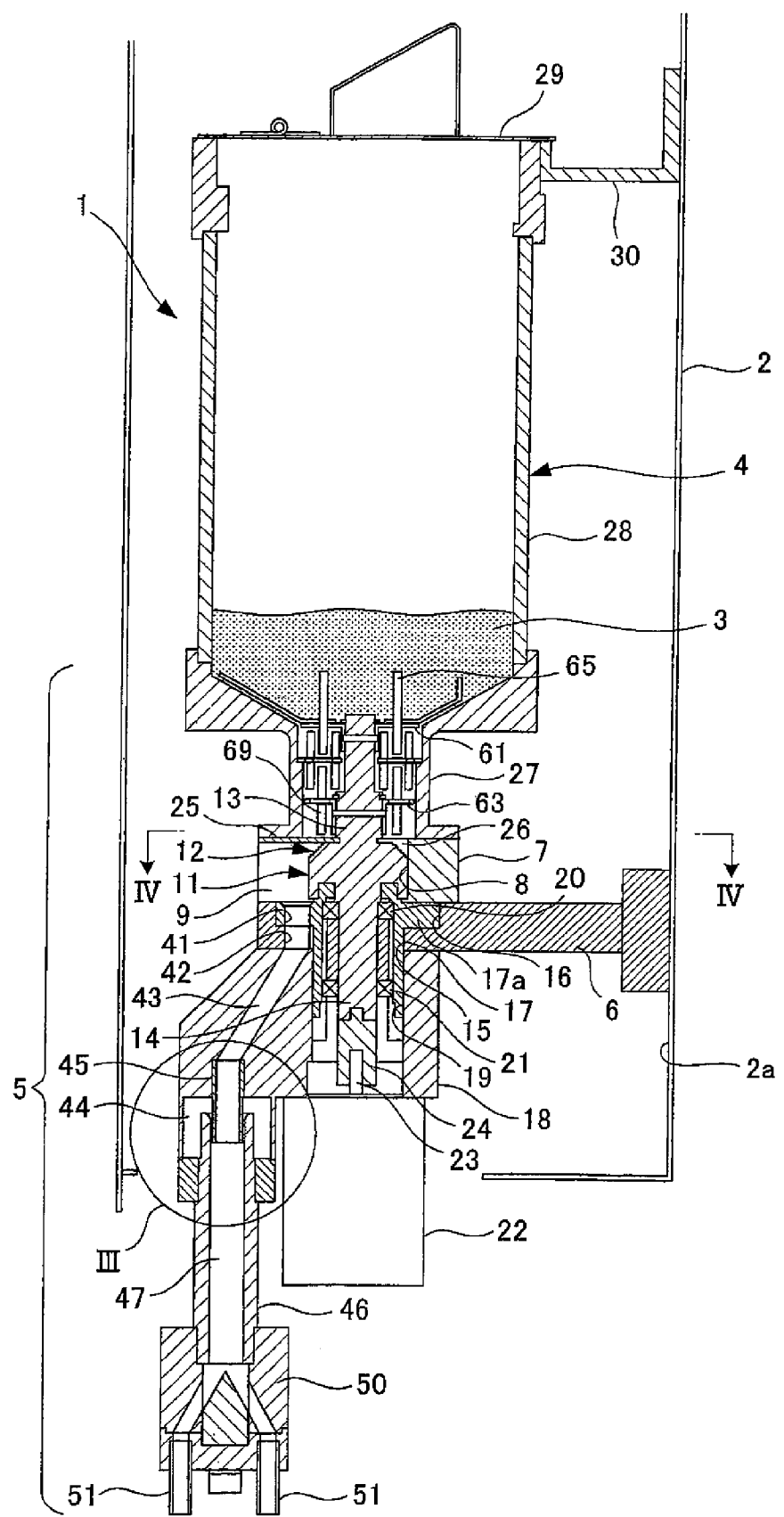
FIG. 1 shows a vertical cross-sectional view taken along a front side of a powdering device for powdering a sheet according to Embodiment 1 of the present invention.

A powdering device for powdering a printing sheet according to the present invention includes: a storage container for storing a powder; and an appropriate-powder-amount distribution mechanism for feeding an appropriate amount of the powder into an air flow for sending the powder, the appropriate-powder-amount distribution mechanism being disposed below the storage container. In the powdering device, the appropriate-powder-amount distribution mechanism includes: an opening which is formed below the storage container, and into which the powder from a storage container is fed; a powder placing member which is rotated about a vertical axis, which has an axisymmetrical shape about a rotational axis, and which has, in a part thereof, a placing section on which the powder fed from the opening is placed; a first scraping member for making, substantially uniform, the amount of the powder placed on the placing section of the powder placing member in association with the rotation of the powder placing member about the vertical axis; and a second scraping member for scraping off, into the air flow, the powder caused to remain on the placing section of the powder placing member by the first scraping member, in association with the rotation of the powder placing member about the vertical axis.

As one aspect of the present invention, the placing section of the powder placing member may have a substantially horizontal placing surface.

As one aspect of the present invention, the placing section of the powder placing member may have a staircase-like outer shape having substantially horizontal placing surfaces and substantially vertical surfaces. In addition, the first scraping member may have a linear scraping surface connecting intersections at each of which one of the substantially horizontal placing surfaces and a corresponding one of the substantially vertical surfaces intersect each other on the outer side. Moreover, the second scraping member may have a scraping surface coinciding with the staircase-like outer shape of the placing section of the powder placing member.

As one aspect of the present invention, the powdering device for powdering a printed sheet may further include: a vertical rotational shaft to which the powder placing member is fixed; and a stirring member for stirring the powder, the stirring member being fixed to the vertical rotational shaft. According to this aspect, the powder placing member rotates about the vertical axis. Accordingly, the provision of the stirring member on the vertical rotational shaft integrated with the powder placing member allows the powder to be stirred along with the supply of the powder performed by the rotation of the powder placing member. This configuration eliminates the need for a driving mechanism for stirring the powder. As a result, the structure of the entire powdering device can be simplified.

Hereinafter, embodiments of a powdering device for powdering a sheet according to the present invention will be described in detail.

Embodiment 1

A powdering device 1 according to Embodiment 1 is mounted, for example, on a fixing member in a vicinity of a transport path of printing products. The powdering device 1 according to Embodiment 1 is housed in a frame 2, and then the frame 2 with the powdering device 1 is fixed to a fixing member.

The powdering device 1 includes a storage container 4 and an appropriate-powder-amount distribution mechanical unit 5 disposed below the storage container 4. The storage container 4 stores a powder 3, and the appropriate-powder-amount distribution mechanical unit 5 discharges a constant amount of the powder 3 stored in the storage container 4 while mixing the powder 3 with air. As will be described later, the appropriate-powder-amount distribution mechanical unit 5 includes: an opening into which the powder in the storage container 4 is fed; a metering element serving as a powder placing member, and having a placing section onto which the powder fed from the opening is placed; a smoothing scraper serving as a first scraping member for making uniform the amount of the powder on the placing section of the metering element; a scraping scraper serving as a second scraping member for scraping off the uniform amount of the powder remaining on the metering element; a mixing-and-discharging mechanical part for forming an air flow, and for mixing the powder scraped off with the air flow so as to discharge the powder; and a stirring mechanical part for stirring the powder 3 in the storage container 4.

First, the appropriate-powder-amount distribution mechanical unit 5 will be described. A plate-shaped base 6 extending in a horizontal direction is attached to an inner wall surface 2a of the frame 2. The appropriate-powder-amount distribution mechanical unit 5 is formed on the basis of the base 6, and includes the base 6 as one of its components. A housing 7 is mounted on the base 6. The housing 7 has a shape obtained by chamfering two corner portions of a plate-shaped block having a rectangular planar shape. A housing hole 8 is formed in a center portion of the housing 7 so as to penetrate the housing 7 in a vertical direction. The housing 7 is partially cut off, in a radial direction, from an inner surface of the housing hole 8 to an outer surface of the housing 7, so that an air introduction portion 9 is formed in the housing 7. The air introduction portion 9 forms a part of the mixing-and-discharging mechanical part, which will be described later. A level difference is formed in a half (on the side where the air introduction portion 9 is located) of the upper surface of the housing 7, so that the half is lower than the other half of the upper surface.

Figure 6:
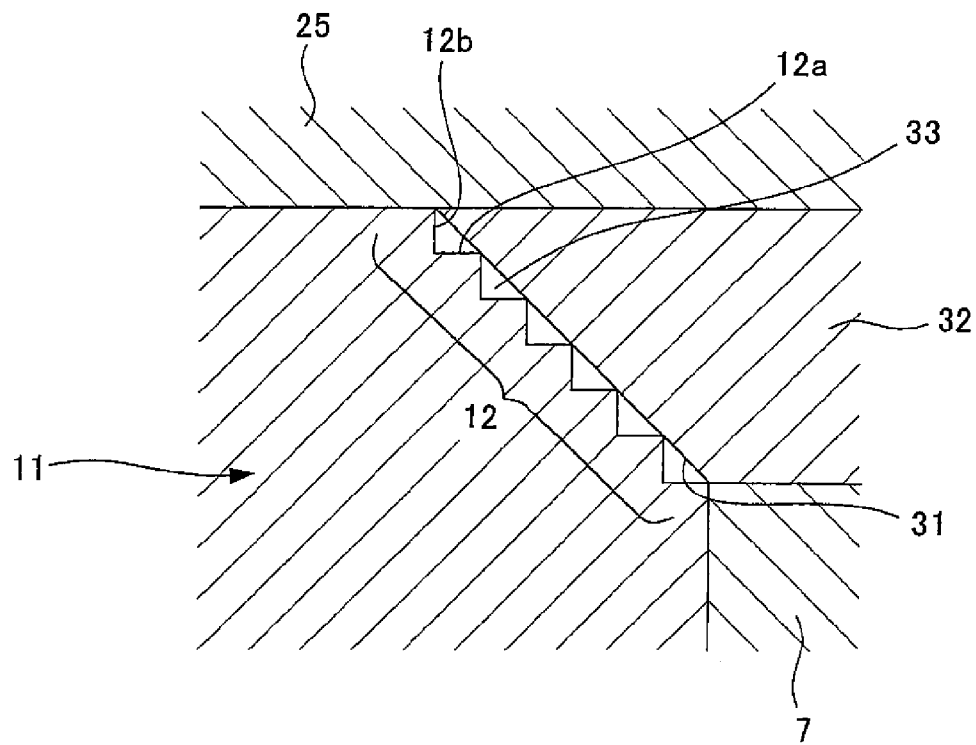
FIG. 6 shows a partially-enlarged view of FIG. 5.
Figure 7:
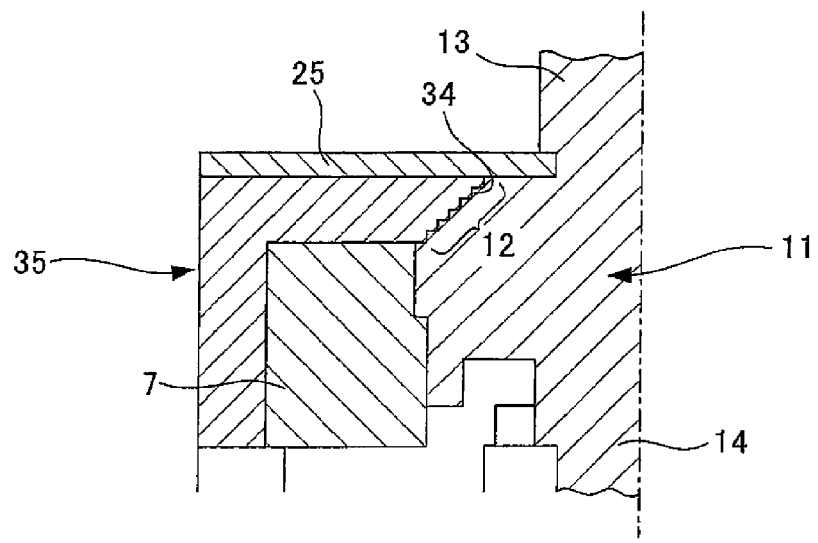
FIG. 7 shows a cross-sectional view, taken along the line VII-VII in FIG. 4, and showing a scraping scraper as viewed in a direction of the arrows VII and VII.

A metering element 11 is inserted, as the powder placing member, in the housing hole 8 of the housing 7. The metering element 11 is shaped like a rotor, and has an upper portion in a truncated conical shape. The metering element 11 is rotatably inserted, with its center axis aligned with the vertical direction, in the housing hole 8. A placing section 12 is formed in the sloping surface of the conical portion of the metering element 11. The placing section 12 has a staircase-like shape along the sloping direction. As shown in FIG. 6, the placing section 12 has horizontal surfaces 12a and vertical surfaces 12b formed therein. The horizontal surfaces 12a form the respective steps of the staircase of the placing section 12, and the vertical surfaces 12b are perpendicular to the horizontal surfaces 12a.

A shaft portion (rotational shaft) 13 and a shaft portion (rotational shaft) 14 are formed integrally in the upper and lower sides of the metering element 11, respectively. A through-hole 15 is formed in the base 6 so as to penetrate the base 6 from the front surface to the back surface. A flange-mounting hole 16 is formed in the base 6 around the upper portion of the through-hole 15. The flange-mounting hole 16 has a diameter larger than that of the through-hole 15. A bearing-holding flange 17 is mounted in the through-hole 15 in such a way that a flange portion 17a of the bearing-holding flange 17 is engaged with the flange-mounting hole 16. A block-shaped motor base 18 is attached to the lower side of the base 6. The motor base 18 has a shaft-insertion hole 19 formed therein and communicating with the through-hole 15 in the base 6. The bearing-holding flange 17, when being mounted in the base 6, is fitted into the shaft-insertion hole 19 in the motor base 18. The shaft portion 14 on the lower side of the metering element 11 is inserted into the bearing-holding flange 17, and rotatably supported by bearings 20 and 21 disposed in upper and lower portions inside the bearing-holding flange 17.

Figure 4:
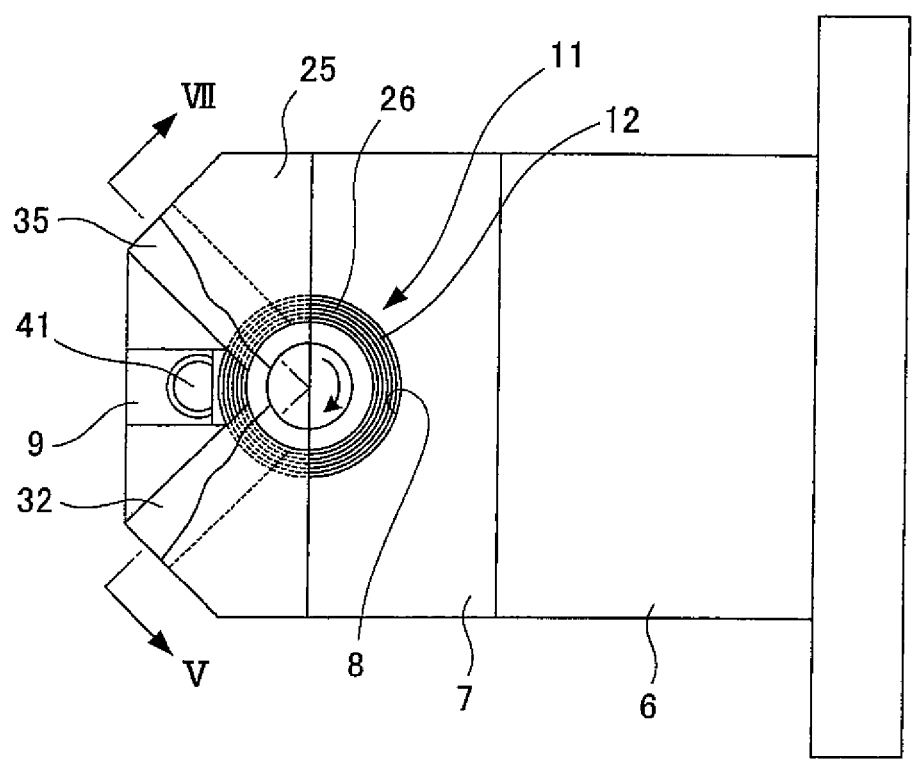
FIG. 4 shows a cross-sectional view, taken along the line IV-IV in FIG. 1, and showing an appropriate-powder-amount distribution mechanical part as viewed in a direction of the arrows IV and IV.

A motor 22 is attached to the lower surface of the motor base 18. A drive shaft 23 of the motor 22 is coupled with the shaft portion 14 on the lower side of the metering element 11 with a coupling member 24 therebetween. Thus, the driving of the motor 22 rotates the metering element 11 inside the housing 7. In Embodiment 1, the metering element 11 is rotated in a clockwise direction in the plan view (in a direction indicated by the arrow in FIG. 4).

A shielding plate 25 is disposed on the surface of the half, lowered with the level difference, in the upper surface of the housing 7. The shielding plate 25 has a thickness equal to that of the level difference. The shielding plate 25 thus closes the upper side of a semi-circular portion (the left-side portion with respect to the center of the metering element 11 in FIG. 4) of the metering element 11 having a circular shape in the plan view. The upper side of the other semi-circular portion of the metering element 11 is opened, so that an opening 26 is formed therein. The opening 26 communicates with a lower portion of the storage container 4, thus allowing the powder 3 to be fed from the storage container 4.

Since the thickness of the shielding plate 25 is the same as that of the level difference in the upper surface of the housing 7, the upper surface of the shielding plate 25 and the upper surface of the part, without the shielding plate 25, of the housing 7 are arranged at the same height. The storage container 4 is set on the upper surfaces of the housing 7 and the shielding plate 25. The storage container 4 is mounted on the upper surfaces of the housing 7 and the shielding plate 25, and has: a bottom portion 27 that houses the shaft portion 13 on the upper side of the metering element 11, a body portion 28 joined to the upper portion of the bottom portion 27; and a lid portion 29 provided on the upper portion of the body portion 28. The storage container 4 is supported on the frame 2 by a supporting member 30. The powder 3 is introduced into the storage container 4 by opening the lid portion 29. The powder 3 is for preventing offset when printed sheets of paper are piled, and is made primarily from cornstarch, for example.

A smoothing scraper 32 serving as the first scraping member is provided, in a region covered with the shielding plate 25 in the housing 7, and at a position on the upstream side of the air introduction portion 9 in the rotating direction of the metering element 11. A flat sloping surface 31 is formed in a tip of the smoothing scraper 32. The flat sloping surface 31 has the same inclination angle as that of the sloping surface of the metering element 11. The smoothing scraper 32 is provided in such a manner that the sloping surface 31, serving as a scraping surface, on the tip is aligned with the staircase-like placing section 12 of the metering element 11. To be more precise, the sloping surface 31 on the tip of the smoothing scraper 32 is positioned close to the corner portions (edges of the staircase) at each of which the corresponding horizontal surface 12a and vertical surface 12b, constituting the placing section 12, intersect each other on the outer side. Because both of the metering element 11 and the smoothing scraper 32 are formed of hard materials, the sloping surface 31 on the tip of the smoothing scraper 32 and each of the aforementioned corner portions are not in direct contact with each other, but face each other with a minute gap therebetween. As shown in FIG. 6, a space (a powder accommodating chamber) 33 is defined by the sloping surface 31 and the horizontal surfaces 12a and the vertical surfaces 12b constituting the placing section 12. As is clear from FIG. 4, the sloping surface 31 has, in the plan view, an arcuate shape to follow the circular shape of the placing section 12.

Figure 8:
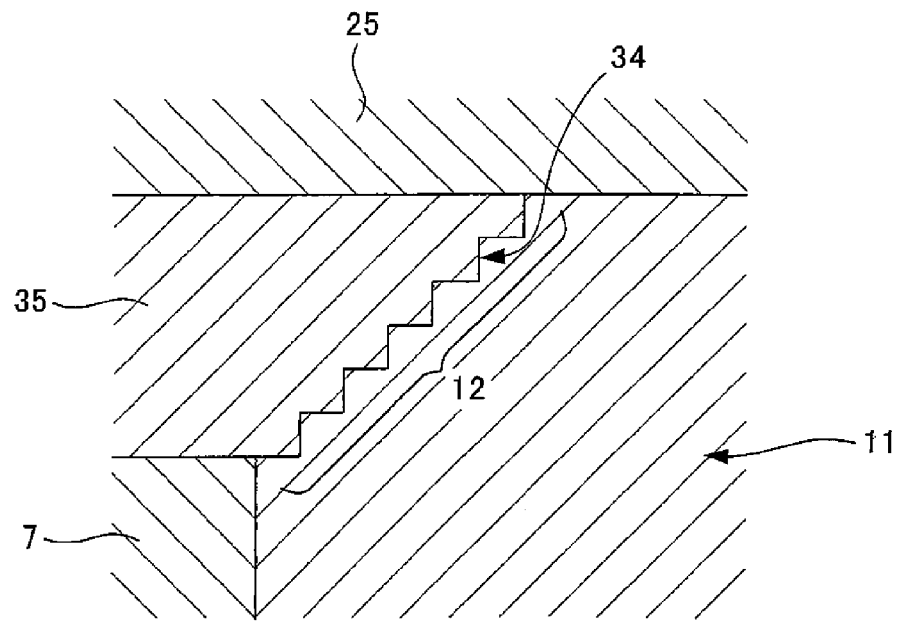
FIG. 8 shows a partially-enlarged view of FIG. 7.

A scraping scraper 35 serving as the second scraping member is provided, in a region covered with the shielding plate 25 in the housing 7, and at a position on the downstream side of the air introduction portion 9 in the rotating direction of the metering element 11. A shape 34 is formed in a tip of the scraping scraper 35. The shape 34 has the same inclination angle as that of the sloping surface of the metering element 11, and also coincides with the shape of the placing section 12. As shown in FIG. 8, the scraping scraper 35 is provided in such a manner that the shape 34, serving as a scraping surface, on the tip is fitted on the placing section 12 of the metering element 11. Because both of the metering element 11 and the scraping scraper 35 are formed of hard materials, the placing section 12 of the metering element 11 and the shape 34 on the tip of the scraping scraper 35 are not in direct contact with each other, but face each other with a minute gap therebetween. As is clear from FIG. 4, the shape 34 has, in the plan view, an arcuate shape to follow the circular shape of the placing section 12. The smoothing scraper 32 and the scraping scraper 35 are arranged radially about the center of the metering element 11.

Figure 2:
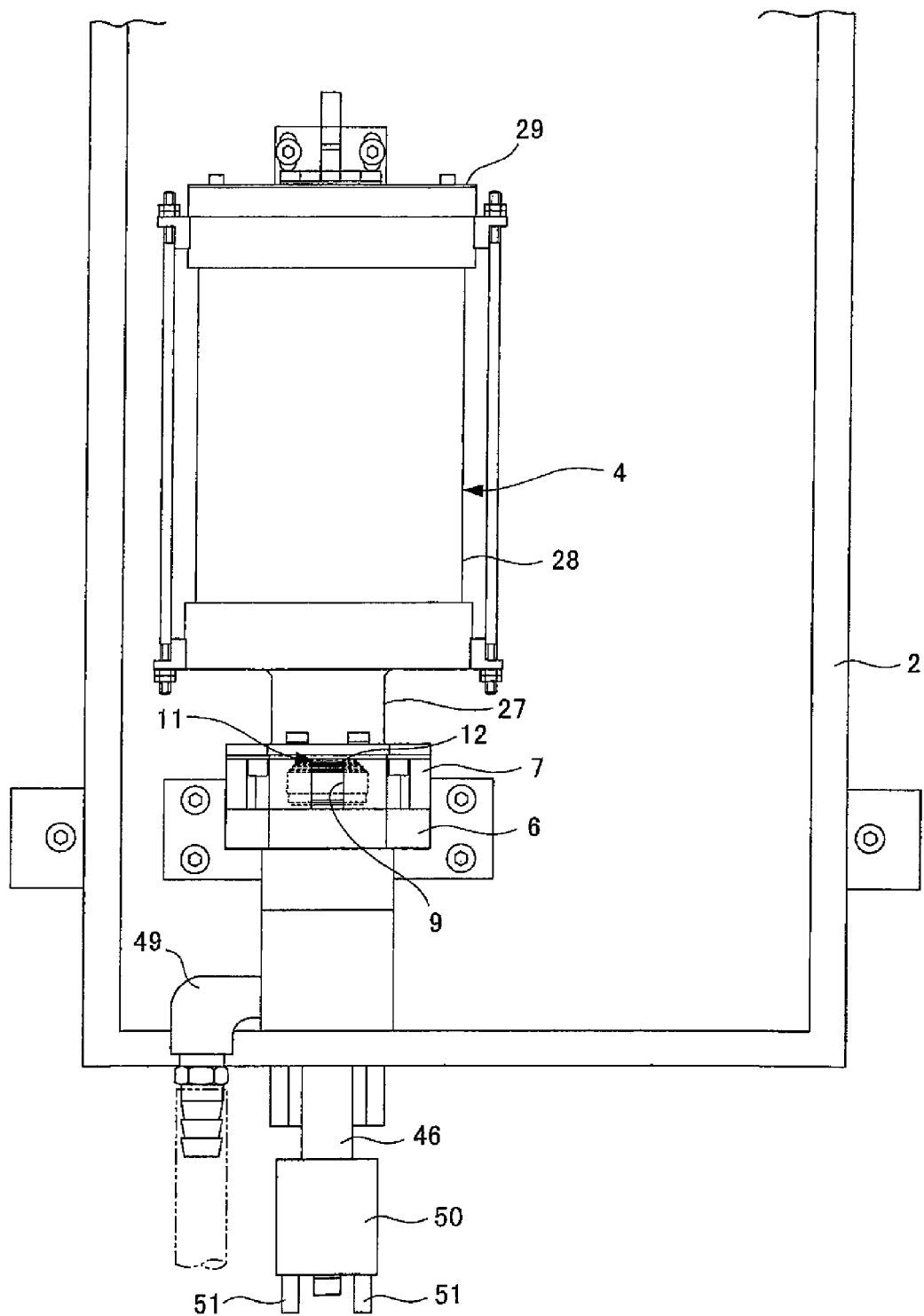
FIG. 2 shows a side view of the powdering device shown in FIG. 1.
Figure 3:
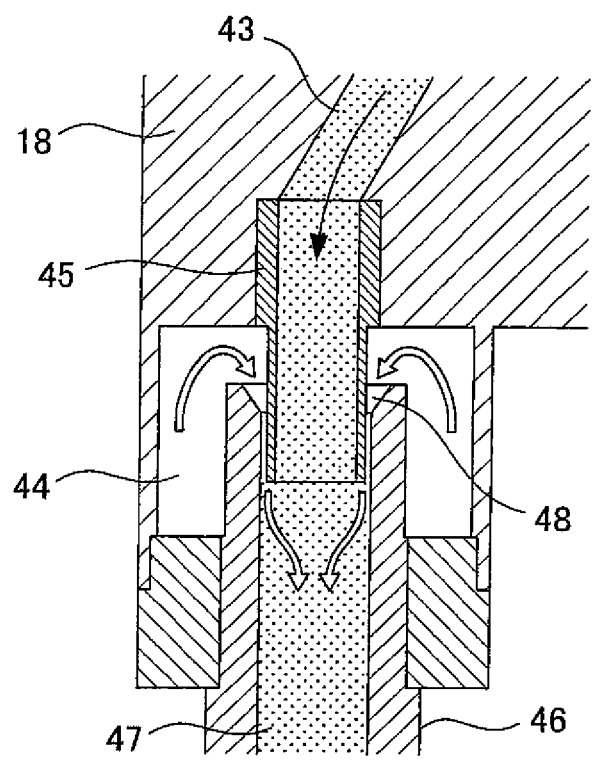
FIG. 3 shows an enlarged view of a part indicated by the circle III in FIG. 1.

Next, a description will be given of the mixing-and-discharging mechanical part, which mixes the powder 3 with an air flow in association with the air introduction portion 9 formed in the housing 7. As shown in FIG. 1, a first powder discharge hole 41 communicating with the air introduction portion 9 is formed in a part, facing the air introduction portion 9, of the bearing-holding flange 17. A second powder discharge hole 42 communicating with the first powder discharge hole 41 is formed in the base 6. A powder discharge passage 43 communicating with the second powder discharge hole 42 is formed in the motor base 18. An air supply chamber 44 is formed in a lower portion of the motor base 18. A connecting pipe 45 is connected to the powder discharge passage 43 inside the air supply chamber 44. A mixture flow passage forming pipe 46, which forms a mixture flow passage 47 therein, is inserted into the air supply chamber 44. The lower end portion of the connecting pipe 45 is inserted into the inner side of the upper end portion of the mixture flow passage forming pipe 46. A gap is formed between the inner surface of the mixture flow passage forming pipe 46 and the outer surface of the connecting pipe 45. As shown in FIG. 3, this gap serves as an air passage 48 connecting the air supply chamber 44 with a mixture flow passage 47 formed inside the mixture flow passage forming pipe 46. The edge portion of the inlet portion of the air passage 48 is tapered. As shown in FIG. 2, air supply piping 49 is connected to the air supply chamber 44. Multiple spray pipes 51 are connected to the lower end of the mixture flow passage forming pipe 46 with a branch connector 50 therebetween. The powder 3 is sprayed with air from these spray pipes 51. In Embodiment 1, the powder 3 discharged downward from the spray pipes 51 passes through unillustrated piping connected to the spray pipes 51 with unillustrated tubes, and is carried to unillustrated nozzles for splaying the powder 3 onto the surface of a printing product. The powder 3 is sent through the tube by the pressure of the air flow.

Figure 9:
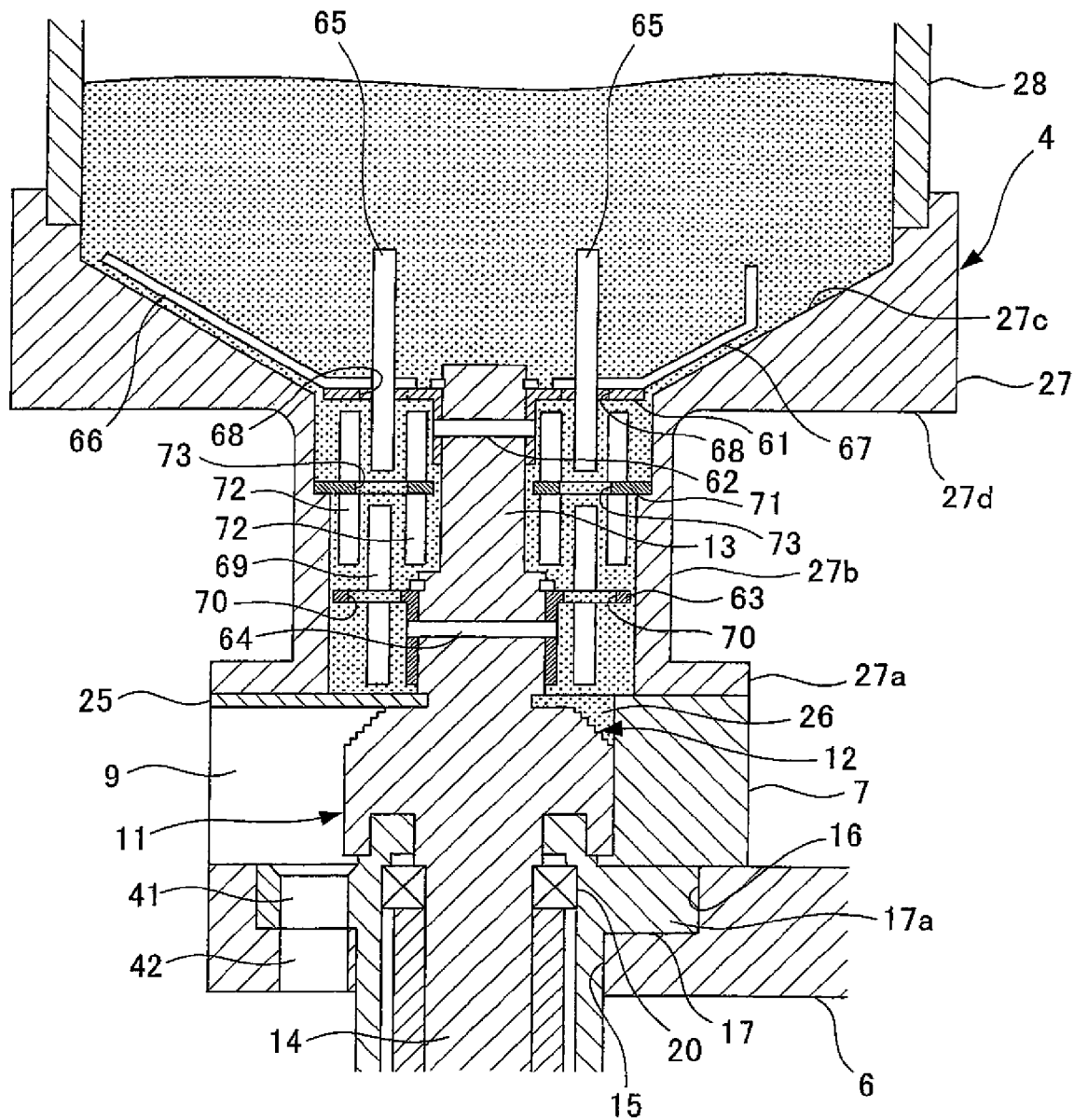
FIG. 9 shows a partially-enlarged view showing a stirring mechanical part in FIG. 1.

Next, a description will be given of the stirring mechanical part for the powder 3. As shown in FIG. 9, the bottom portion 27 of the storage container 4 includes: a leg portion 27a attached to the housing 7 and the shielding plate 25; a cylindrical stirring portion 27b continuous with the leg portion 27a; and a connecting portion 27d connecting the upper portion of the stirring portion 27b with the body portion 28. The inner surface of the connecting portion 27d is formed into a guide surface 27c inclined downward toward the stirring portion 27b.

The shaft portion 13 integrated with the metering element 11 in the upper side thereof is positioned inside the stirring portion 27b of the bottom portion 27 of the storage container 4. An upper stirrer supporting circular plate 61 is supported on the upper portion of the shaft portion 13 by a pin 62 penetrating the shaft portion 13 in a direction perpendicular to the axis. A lower stirrer supporting circular plate 63 is supported on the lower portion of the shaft portion 13 by a pin 64 penetrating the shaft portion 13 in the direction perpendicular to the axis. The upper stirrer supporting circular plate 62 is provided with, as stirring members, multiple stirrers 65 penetrating the plate 62 in the vertical direction, a stirrer 66 extending along the guide surface 27c, and a stirrer 67 extending along the guide surface 27c and then bent upward in the middle. The upper stirrer supporting circular plate 61 has numerous through-holes 68 formed therein for allowing the powder 3 to pass therethrough. The lower stirrer supporting circular plate 63 is similarly provided with, as stirring members, multiple stirrers 69 penetrating the plate 63 in the vertical direction, and the lower stirrer supporting circular plate 63 also has a through-hole 70 formed therein for allowing the powder 3 to pass therethrough. In addition, an annular plate-shaped stator supporting circular plate 71 is attached to a portion, positioned slightly above a center in the vertical direction, of the inner surface of the stirring portion 27b. The annular plate-shaped stator supporting circular plate 71 is provided with, as fixed stirring members, multiple stirring stators 72 in a manner that the stirring stators 72 do not interfere with the stirrers 65 and 69 provided to the upper and lower stirrer supporting circular plates 61 and 63. The stator supporting circular plate 71 also has a through-hole 73 formed therein for allowing the powder 3 to pass therethrough.

Next, a description will be given of the powdering operation performed on a printing product by the powdering device 1 having the above-described configuration.

When the powder 3 is to be sprayed on a printing product, the motor 22 is driven. The driving of the motor 22 rotates the metering element 11 inside the housing 7. The stirrers 65, 66, 67, and 69, constituting the stirring mechanical part, are also rotated in association with the rotation of the metering element 11. The rotating stirrers 65, 66, 67, and 69 pass by the fixed stirring stators 72, thus causing the stirring action. With this stirring action, the powder 3 on the bottom of the storage container 4 is stirred and loosened, and accordingly, is prevented from being agglomerated. Although only the rotating stirrers 65, 66, 67, and 69 are sufficient as the stirring members, the provision of the fixed stirrer 72, which the rotating stirrers 65 and 69 pass by, facilitates the stirring operation.

While being stirred and loosened, the powder 3 passes and moves downward through the through-holes 68, 73, and 70, respectively in the upper stirrer supporting circular plate 61, the stator supporting circular plate 71, and the lower stirrer supporting circular plate 63. The powder 3 then enters the inside of the housing 7 through the opening 26 in the metering element 11, eventually being placed on the placing section 12 of the rotating metering element 11.

Figure 5:
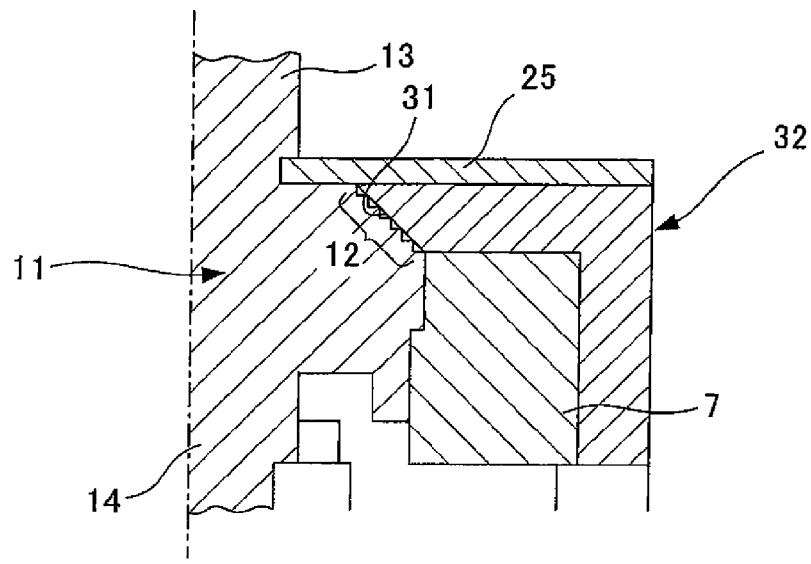
FIG. 5 shows a cross-sectional view, taken along the line V-V in FIG. 4, and showing a smoothing scraper as viewed in a direction of the arrows V and V.

The rotation of the metering element 11 causes the powder 3 on the placing section 12 to move along with the metering element 11. When a part of the metering element 11 goes under the smoothing scraper 32, the powder 3 overfilled on the placing section 12 in this part is scraped off. In other words, the powder 3 remains only in the space 33 formed by the horizontal surfaces 12a, the vertical surfaces 12b, and the sloping surface 31, as shown in FIG. 6, which is an enlarged view of FIG. 5. At this moment, only a constant amount of the powder 3 is held by the metering element 11. Meanwhile, the weight of the powder 3 in the other part is not applied to the powder 3 in the space 33.

When the part, holding the powder 3, of the placing section 12 goes under the scraping scraper 35 in association with the rotation of the metering element 11, the powder 3 in the space 33 of this part is scraped off by the shape 34 on the tip of the scraping scraper 35. The powder 3 thus scraped off falls down into the air introduction portion 9.

On the other hand, air is supplied to the air supply chamber 44. The air enters the air passage 48 through the tapered part in the upper end portion of the mixture flow passage forming pipe 46, and flows into the mixture flow passage forming pipe 46 as a jet stream. This jet stream creates a negative pressure on the connecting pipe 45 side, and thereby generates an air flow from the air introduction portion 9 to the mixture flow passage 47 through the first powder discharge hole 41, the second powder discharge hole 42, the powder discharge passage 43, and the connecting pipe 45. This air flow causes the powder 3, falling down into the air introduction portion 9, to enter into the mixture flow passage 47 through the first powder discharge hole 41, the second powder discharge hole 42, the powder discharge passage 43, and the connecting pipe 45. The powder 3 then passes through the branch connector 50 attached to the lower portion of the mixture flow passage forming pipe 46, and is discharged along with the air from the spray pipes 51, eventually being sprayed onto a printing product.

The metering element 11 is continuously operated, for example. Specifically, the powder 3 is sprayed, regardless of whether or not a printing product actually exists below the unillustrated nozzles for spraying the powder onto the surface of a printing product, the nozzles being connected to the spray pipes 51 with the unillustrated tubes and unillustrated piping interposed therebetween. This is because of the following reason. Since a time interval is short between two successively fed printing products, it is impossible to control, at such a short interval, the behavior of the powder 3 transferred by the air flow and flying down. If such control is attempted, the powder 3 may adversely be caused to fly down unevenly onto a printing product as a matter of reality. If the interval between two successive printing products is large enough to control the behavior of the powder 3, the metering element 11 may be intermittently operated.

As described above, according to the powdering device 1 for powdering a sheet according to Embodiment 1, the powder 3 is placed on the placing section 12 of the metering element 11 through the openings (26) in the appropriate-powder-amount distribution mechanical unit 5. Then, the powder 3 placed on the placing section 12 is scraped by the smoothing scraper 32 in association with the rotation of the metering element 11 about the vertical axis, so that a substantially constant amount of the powder 3 remains. Subsequently, the powder 3 remaining on the placing section 12 is scraped off by the scraping scraper 35, so as to be carried in the air flow generated in the air introduction portion 9 located below. The powder 3 is mixed with the air, and eventually sprayed onto a printing product. Accordingly, a constant amount of the powder 3 can always be sprayed onto a printing product. In other words, the scraping off by the smoothing scraper 32 allows a substantially constant amount of the powder 3 to remain on the placing section 12. Moreover, while the remaining powder 3 is moved along with the placing section 12, the weight of the powder 3 in the other part is not applied to the remaining powder 3, so that the density of the remaining powder 3 is maintained at a constant level. As a result, a stable amount of powder can constantly be sprayed onto a sheet.

In addition, according to the powdering device 1 for powdering a sheet according to Embodiment 1, the powder 3 is stirred by the fixed stirring stators 72 as well as the stirrers 65, 66, 67, and 69 rotating along with the metering element 11. Accordingly, the powder 3 is not agglomerated, and is thus stably fed. Moreover, the rotation of the metering element 11 allows the powder 3 to be stirred along with the feeding of the powder 3. This structure eliminates the need for any driving mechanism for stirring the powder 3, and thus simplifies the entire structure of the spraying device.

Moreover, controlling the rotational speed of the metering element 11 makes it possible to change the amount of the powder 3 to be sprayed. In this way, the powdering device can be adapted according to the type of printing medium (paper, a film, or the like), the printing speed, the type and density of a printing image, and the like.

Embodiment 2

Figure 10:
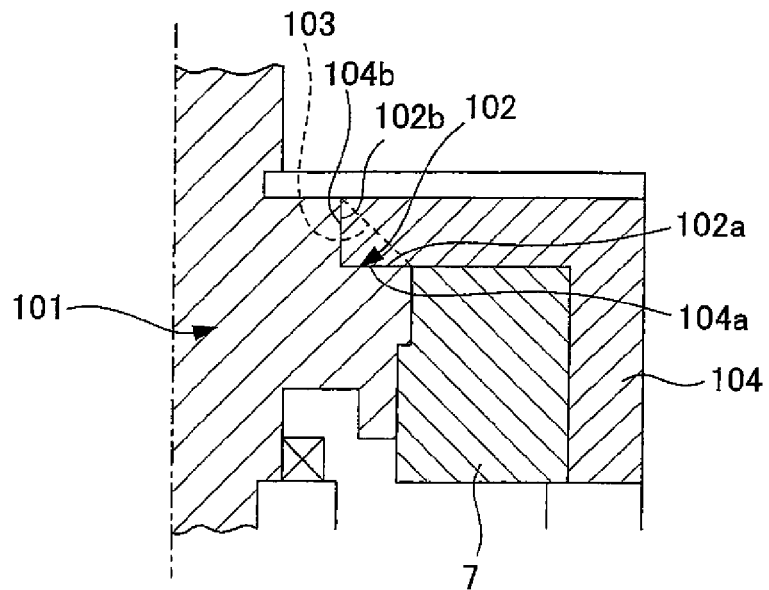
FIG. 10 shows a cross-sectional view showing another example of a metering element.

Another embodiment of the metering element serving as the powder placing member is shown in FIG. 10. The metering element 101 shown in FIG. 10 has a placing section 102 having therein a single horizontal surface 102a and a single vertical surface 102b perpendicular to the horizontal surface 102a. In Embodiment 2, a tip of a smoothing scraper serving as the first scraping member is formed in a sloping surface 103 as indicated by the dashed line in FIG. 10. On the other hand, a tip of a scraping scraper 104 serving as the second scraping member has shapes 104a (horizontal surface) and 104b (arcuate vertical surface) that coincide with the horizontal surface 102a and the vertical surface 102b of the placing section 102, respectively.

The powdering device employing the metering element 101 according to Embodiment 2 also provides the same operation and effects as those provided by the powdering device according to Embodiment 1. Moreover, the simple shape of the metering element 101 facilitates the manufacture and also reduces the manufacturing costs.

Embodiment 3

Figure 11:
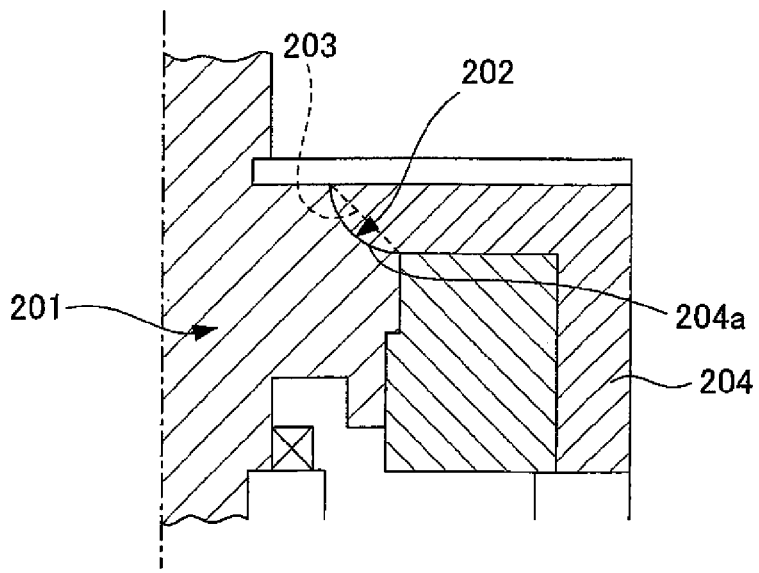
FIG. 11 shows a cross-sectional view showing still another example of the metering element.

Still another embodiment of the metering element serving as the powder placing member is shown in FIG. 11. This metering element 201 has a placing section 202 having a cross-sectional shape of semi-circular arcuate surface. In Embodiment 3, a tip of a smoothing scraper serving as the first scraping member is formed in a sloping surface 203 as indicated by the dashed line in FIG. 11. On the other hand, a tip of a scraping scraper 204 serving as the second scraping member has a shape 204a (an arcuate surface) which coincides with the arcuate surface of the placing section 202.

The powdering device employing the metering element 201 according to Embodiment 3 also provides the same operation and effects as those provided by the powdering device according to Embodiment 1. Moreover, the simple shape of the metering element 201 facilitates the manufacture and also reduces the manufacturing costs.

Furthermore, the powder placing section formed in the metering element is not limited to those (having the staircase-like shape, the single step, the arcuate shape, and the like) shown in the above-described embodiments, and various other modifications may be conceived of. Moreover, the stirring mechanical part is only an example as well, and the arrangement, shapes, and the like, of the stirrers may be modified in various ways.

The invention thus described, it will be obvious that same may be varied in many ways. Such variations are not to be regarded as a departure from the spirit and scope of the invention, and all such modifications as would be obvious to one skilled in the art are intended to be included within the scope of the following claims.

What is claimed is:

1. A powdering device for powdering a printed sheet, comprising:
    a storage container for storing a powder; and
    an appropriate-powder-amount distribution mechanism for feeding an appropriate amount of the powder into an air flow for sending the powder, the appropriate-powder-amount distribution mechanism being disposed below the storage container, wherein
    the appropriate-powder-amount distribution mechanism includes:
        an opening which is formed below the storage container, and into which the powder from the storage container is fed;
        a powder placing member which is rotated about a vertical axis, which has an axisymmetrical shape about a rotational axis, and which has, in a part thereof, a placing section on which the powder fed from the opening is placed;
        a first scraping member for making, uniform, the amount of the powder placed on the placing section of the powder placing member in association with the rotation of the powder placing member about the vertical axis; and
        a second scraping member for scraping off, into the air flow, the powder caused to remain on the placing section of the powder placing member by the first scraping member, in association with the rotation of the powder placing member about the vertical axis,
    wherein the placing section of the powder placing member has a horizontal placing surface, wherein
    the placing section of the powder placing member has a staircase-like outer shape having horizontal placing surfaces and vertical surfaces,
    the first scraping member has a linear scraping surface connecting intersections of the horizontal placing surfaces and the vertical surfaces of the placing section of the powder placing member, and
    the second scraping member has a scraping surface coinciding with the staircase-like outer shape of the placing section of the powder placing member.

2. The powdering device for powdering a printed sheet according to claim 1, further comprising:
    a vertical rotational shaft to which the powder placing member is fixed; and
    a stirring member for stirring the powder, the stirring member being fixed to the vertical rotational shaft.

3. The powdering device for powdering a printed sheet according to claim 2, further comprising:
    a fixed stirring member which is provided on the storage container side, and which the stirring member, revolving along with the vertical rotational shaft, passes by.

4. The powdering device for powdering a printed sheet according to claim 1, wherein
    the powder placing member is integrally provided with a shaft portion formed in a lower side of the power placing member,
    the shaft portion is rotatably supported on a fixing member, and
    a motor is coupled to the shaft portion.

5. The powdering device for powdering a printed sheet according to claim 1, wherein
    the appropriate-powder-amount distribution mechanism further comprises:
        a housing having a housing hole penetrating the housing in the vertical direction; and
        a metering element having a truncated conical shape and serving as the powder placing member, the metering element being housed in the housing hole of the housing, and driven to rotate about the vertical axis, and
    the opening is a part of a space formed by the housing and the metering element.

6. The powdering device for powdering a printed sheet according to claim 5, wherein
    an air introduction portion into which the powder scraped off by the second scraping member falls is formed between the first scraping member and the second scraping member in the housing, and
    air that forms the air flow for carrying the powder is introduced from the air introduction portion.

7. The powdering device for powdering a printed sheet according to claim 1, wherein
    the placing section of the powder placing member has a surface with an arcuate cross-sectional shape.

* * * * *